US009397457B1

(12) United States Patent  
Rodriguez Pedraza et al.

(10) Patent No.: US 9,397,457 B1  
(45) Date of Patent: Jul. 19, 2016

(54) O-SHAPED BUSWAY METER PACK SECTION

(71) Applicant: SCHNEIDER ELECTRIC USA, INC., Palatine, IL (US)

(72) Inventors: Dante Abraham Rodriguez Pedraza, Nuevo Leon (MX); Ricardo Nicanor Palmer, Apodaca (MX); Cristina Rosas Salazar, Torreon Coahuila (MX)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 0 days.

(21) Appl. No.: 14/719,631

(22) Filed: May 22, 2015

(51) Int. Cl.
    H01R 25/16   (2006.01)

(52) U.S. Cl.
    CPC ................................ H01R 25/162 (2013.01)

(58) Field of Classification Search
    CPC ........................... H01R 13/05; H01R 13/71
    See application file for complete search history.

(56) References Cited

U.S. PATENT DOCUMENTS

| | | | | |
|---|---|---|---|---|
| 5,383,090 A * | 1/1995 | Freundner | ............ | H01R 4/5091 174/68.2 |
| 5,982,611 A * | 11/1999 | Campbell | ................ | H02B 1/21 174/541 |
| 6,947,854 B2 * | 9/2005 | Swarztrauber | ......... | G01D 4/008 340/870.01 |
| 7,091,417 B1 | 8/2006 | Jur et al. | | |
| 7,267,576 B1 * | 9/2007 | Seff | ....................... | G01R 11/04 439/517 |
| 7,367,830 B2 | 5/2008 | Jur et al. | | |
| 7,969,750 B2 * | 6/2011 | Jur | .......................... | H02G 5/08 361/807 |
| 8,223,476 B2 * | 7/2012 | Zhang | ...................... | H02B 1/20 174/54 |
| 8,711,549 B2 * | 4/2014 | Rodrigues | ................ | H02G 5/10 174/68.2 |

OTHER PUBLICATIONS

Eaton Busway In-Line Meter Main PTO Product Focus Brochure, Pow-R-Way III LV Busway Tennant Metering Power Takeoffs, 2005 Eaton Corporation, Publication No. PA01701003E, Jun. 2005.
Siemens Sentron Busway System, Selection and Application Guide, Siemens Industry, Inc., BUSA-SENT1-1213, 2013.
MP METER-PAK™ Meter Centers; EZ METER-PAK® Meter Centers; Catalog No. 4100CT9801, Square D Company May 1999.
EZ METER-PAK® Meter Centers, Catalog 4100CT0701 2008, Schneider Electric USA, 2008.
Siemens Industry; Busway Selection and Application Guide, Sentrol Busway Systems, Meter Center Cubicles, 2013, p. 30.
Eaton Electrical; Busway In-Line Meter Main PTO, Pow-R-Way III LV Busway, Tennant Metering Power Takeoffs, 2013, pp. 32-33.

* cited by examiner

*Primary Examiner* — Truc Nguyen  
(74) *Attorney, Agent, or Firm* — Locke Lord LLP

(57) ABSTRACT

A busway center tap 102 for a meter center 100, comprises an open-shaped bus 112 located in a housing 101, including three phased open-shaped bus bars 112A-C connected to respective feeder bus bars 104A-C, the open-shaped bus forming an opening 115 through which a cross bus 120 may be accessed. A circuit interrupter 116 is preferably mounted in the housing and compactly positioned in the opening formed by the open-shaped bus. The circuit interrupter includes three phased line side connectors 114A-C connected to respective open-shaped bus bars and three phased load side connectors 118A-C coupled to respective cross bus bars. Positioning the circuit interrupter in the opening formed by the open-shaped bus, achieves a compact, planar layout occupying minimal space with minimal complexity, enabling reduction in overall size of the busway center tap. The open-shaped bus bars may alternately be directly connected through the opening, to the cross bus bars.

15 Claims, 14 Drawing Sheets

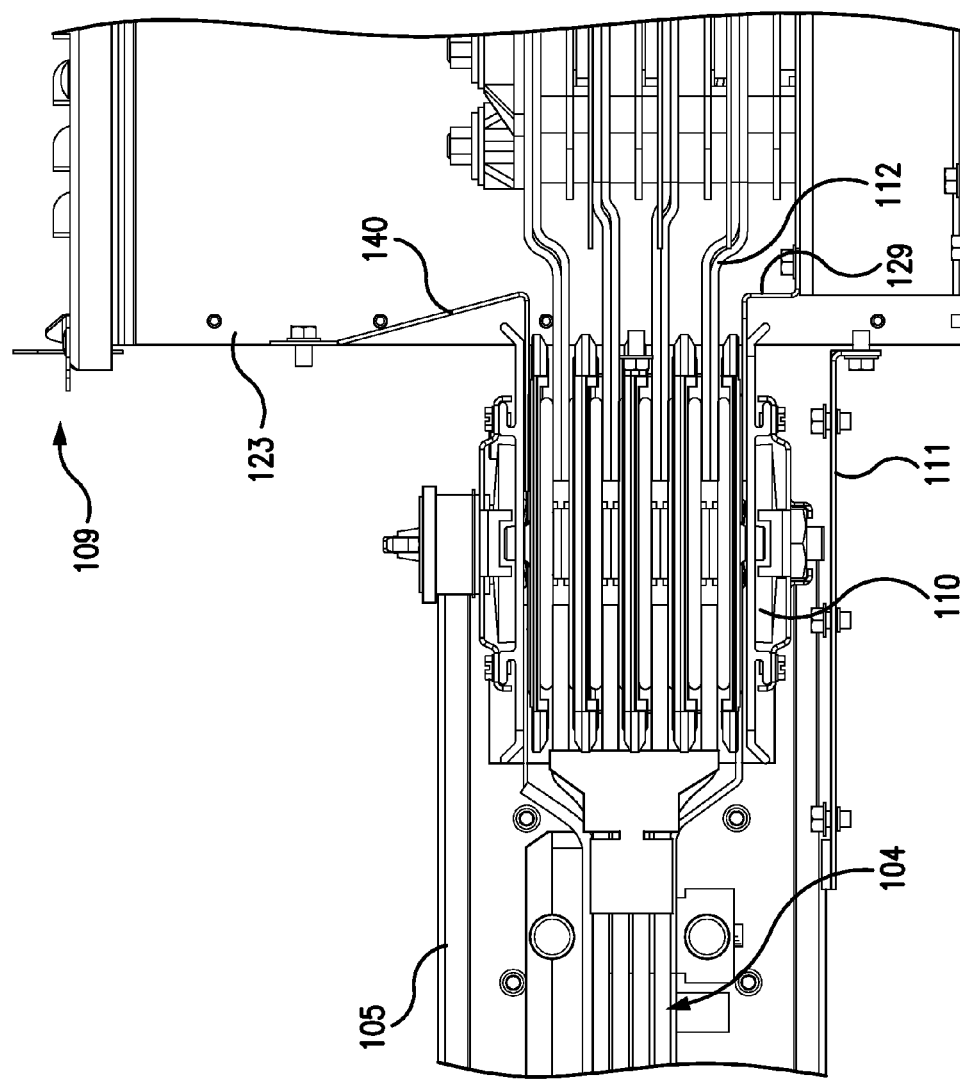

O-SHAPED BUSWAY METER PACK SECTION

BACKGROUND OF THE INVENTION

1. Field of the Invention

The invention disclosed relates generally to electric power distribution centers, and in particular to meter centers or meter packs for tapping-off power from a feeder busway and distributing metered power to multiple branches.

2. Discussion of the Related Art

Power distribution systems for high rise residential and commercial buildings frequently employ vertical feeder busways to deliver power from a utility entrance in the basement of the building, to a meter center or meter pack in a service room on each floor, where power to individual customers or tenants is separately metered. The meter center or meter pack is a modular, multiple metering unit that taps-off power from the feeder busway and provides it through a master switch, circuit breaker, or direct connection, to metering stacks of multiple watt/hour meters that measure the power being delivered to the individual customers or tenants on that floor.

The space requirements for service rooms and spaces in tall buildings are significant. These rooms will house equipment for many different systems, including the power distribution meter center or meter pack, feeder and plug-in busways, riser busways to the next floor, lighting controls, emergency lighting equipment, fire alarm equipment and associated battery cabinets, and security system equipment. Accordingly, it is important to minimize the space occupied by the meter center or meter pack, while maximizing the input current-handling capacity of the unit.

An example meter center or meter pack is described in U.S. Pat. No. 7,367,830, which depicts a busway fitting to tap-off power from a vertical feeder bus, wherein the switch connected to the feeder bus is disposed in a horizontal orientation and the buses coupled to the switch assembly also extend horizontally, thereby occupying a reduced amount of space. A problem with this design is that it is a complex structure that occupies significant space and does not accept more than one feeder bus.

Accordingly, there is a need for a meter center or meter pack that has a simplified structure, occupies minimal space, and can accept more than one feeder bus.

SUMMARY OF THE INVENTION

Example embodiments of the invention provide an improved design for a meter center or meter pack that has a simplified structure, occupies minimal space, and can accept single, double, triple, or multiple runs of a feeder bus.

In accordance with an example embodiment of the invention, the meter center or meter pack includes a busway center tap, which has a simplified structure, occupies minimal space, and can accept more than one feeder bus. The busway center tap comprises an open-shaped bus located in a housing. The open-shaped bus includes three phased open-shaped bus bars electrically connected to respective feeder bus bar phases. The open-shaped bus forms an opening through which a cross bus may be accessed.

In accordance with an example embodiment of the invention, a circuit interrupter is mounted in the housing and is compactly positioned in the opening formed by the open-shaped bus. The circuit interrupter includes three phased line side connectors electrically connected to respective open-shaped bus bar phases. The circuit interrupter includes three phased load side connectors electrically coupled to respective cross bus bar phases. The cross bus passes out of both sides of the housing and provides power to metering stacks on both sides in a center tap configuration.

In accordance with an example embodiment of the invention, positioning the circuit interrupter in the opening formed by the open-shaped bus, achieves a compact, planar layout occupying minimal space with minimal complexity, enabling a reduction in overall size of the busway center tap.

In accordance with an example embodiment of the invention, the open-shaped bus bar phases may be directly connected through the opening formed by the open-shaped bus, to the respective cross bus bar phases.

In accordance with an example embodiment of the invention, the open-shaped bus may be an O-shaped rectangular annulus surrounding the opening, or it may include C-shaped, U-shaped, or L-shaped bus components.

In accordance with an example embodiment of the invention, the circuit interrupter may be a circuit breaker or a switch located in the opening formed by the open-shaped bus.

In accordance with an example embodiment of the invention, the feeder busway may be comprised of three component buses in a triple run, each component bus including three phased feeder bus bars, each electrically connected by a common joint pack to a respective one of the three phased open-shaped bus bars, to balance current carried in the component buses.

In this manner, the meter center or meter pack has a simplified structure, occupies minimal space, and can accept more than one feeder bus.

DESCRIPTION OF THE FIGURES

FIG. 6A is a side view, in partial cross section, of the open-shaped bus, lying on its back side, showing the three phased feeder bus bars and one neutral feeder bus bar of the feeder busway, are each electrically connected by a joint pack to a respective one of the three phased open-shaped bus bars and one neutral open-shaped bus bar.

DETAILED DESCRIPTION OF EMBODIMENTS OF THE INVENTION

Figure 1:
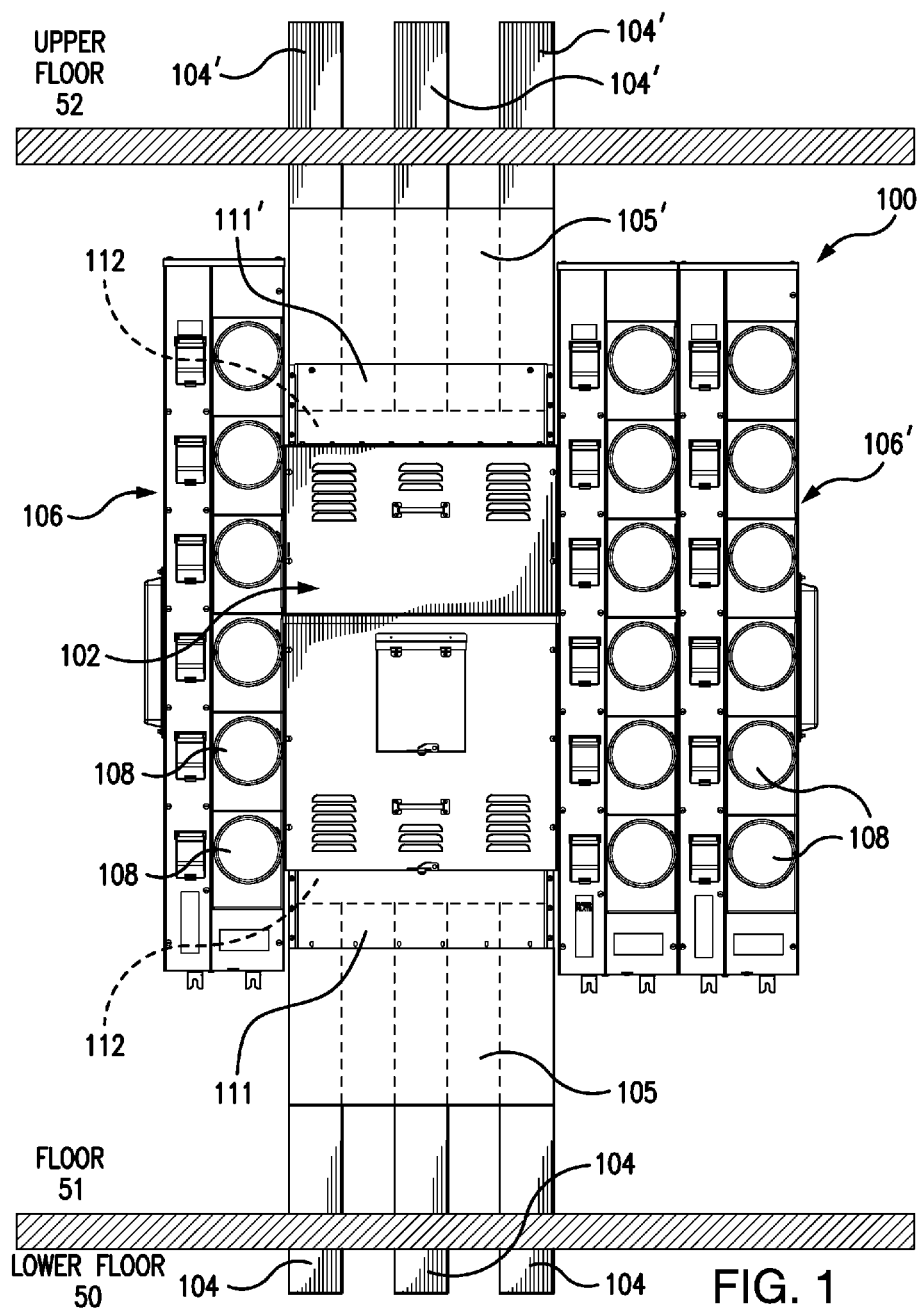
FIG. 1 is a front view of meter center or meter pack on one floor of a multistory building, which includes a busway center tap in a housing, with a first meter stack on the right side and a second meter stack on the left side of the housing, a feeder busway providing power from a floor below, and a riser busway to transfer residual power to a floor above.

In accordance with an example embodiment of the invention, FIG. 1 is a front view of meter center or meter pack 100 on one floor 51 of a multistory building. Meter centers are employed to distribute power, separately metered, to individual customers or tenants occupying the same floor of a high rise residential and commercial building. Vertical feeder busway 104 delivers power to the meter center 100, the power originating from a utility entrance in the basement of the building, and delivered through busways from floors 50 below. The feeder busway 104 may include three phased feeder bus bars and one neutral feeder bus bar, wherein each of the feeder bus bars is electrically coupled to respective phases of a utility power source.

The example meter center 100 includes a busway center tap 102 in a housing, which provides power to metering stacks 106 and 106' on both sides, in a center tap configuration. The meter center taps-off power from the feeder busway 104 and provides it to both of the metering stacks 106 and 106'. Multiple watt/hour, branch power meters 108 in the stacks, measure the power being delivered to the individual customers or tenants on that floor 51.

The feeder busway may be comprised of three component buses 104 in a triple run busway 105, connected by a common, lower joint pack 110 (FIG. 2B) to the bottom of the busway center tap 102, to balance current carried in the component buses. A joint pack cover 111 provides a cover for the feeder bus 104, joint pack 110, and busway canter tap 102, as shown in FIG. 6A. A riser busway 104' is connected by an upper joint pack to the top of the busway center tap 102, for transferring residual power not used on the present floor 51, for distribution on the next floor 52 above. The riser busway 104' may include three phased riser bus bars and one neutral riser bus bar.

Figure 2:
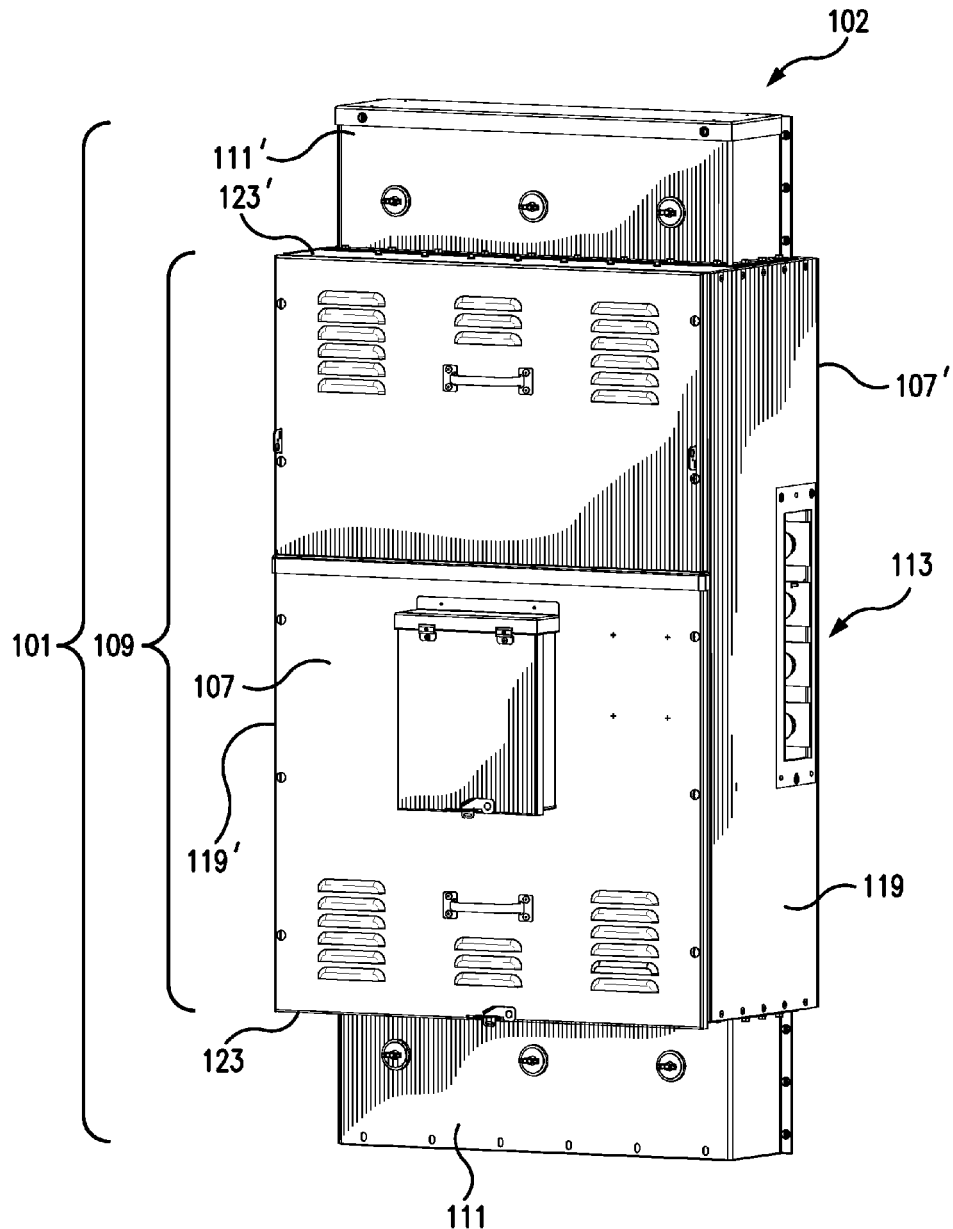
FIG. 2 is a front, right perspective view of the busway center tap housing in its regular standing orientation, which includes a central cabinet, a bottom joint pack cover, and a top joint pack cover, the figure showing an access port on the side of the housing for passage of a cross bus.

FIG. 2 is a front, right perspective view of the example housing 101 of the busway center tap 102, in its regular standing orientation. The housing 101 includes a central cabinet 109 with a front side 107 and a back side 107'. The housing 101 includes a bottom joint pack cover 111 for covering the joint pack 110 (FIG. 6A) connecting to the feeder busway 104 at the bottom side 123, and a top joint pack cover 111' for covering a joint pack connecting to the riser busway 104' at the top side 123'. The figure shows an access port 113 on the side 119 of the housing 101, for passage of a cross bus 120A-N (FIG. 2B). A similar access port is located on the opposite side 119' of the housing 101. The cross bus passes through the access ports 113 on the opposite sides of the housing 101 and through an interior space of the housing 101, extending horizontally along a back portion of the interior space of the housing.

Figure 2A:
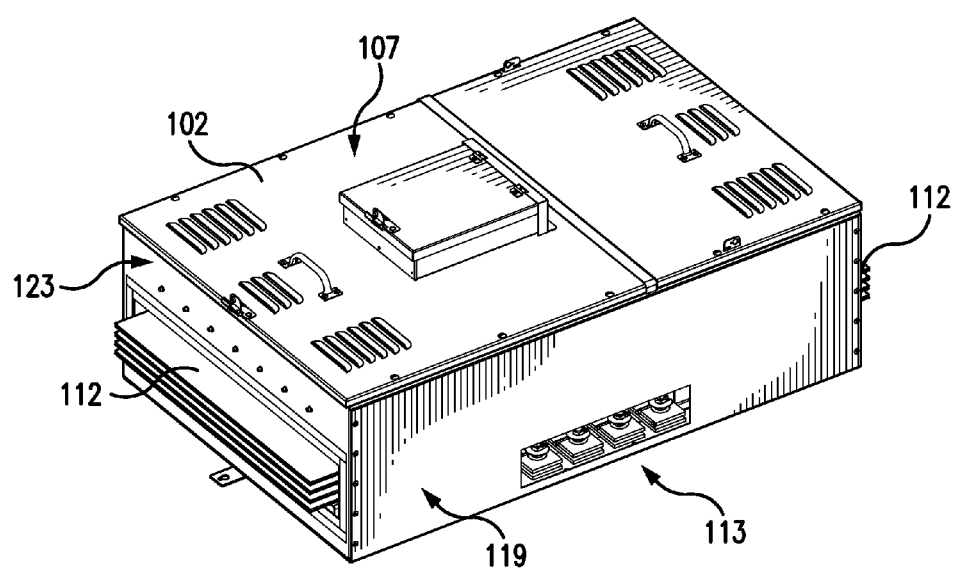
FIG. 2A is a front, right perspective view of the busway center tap housing in a tipped over horizontal position, lying on its back side with the front side facing up, showing a bottom portion of an open-shaped bus projecting from the bottom of the central cabinet.
Figure 2B:
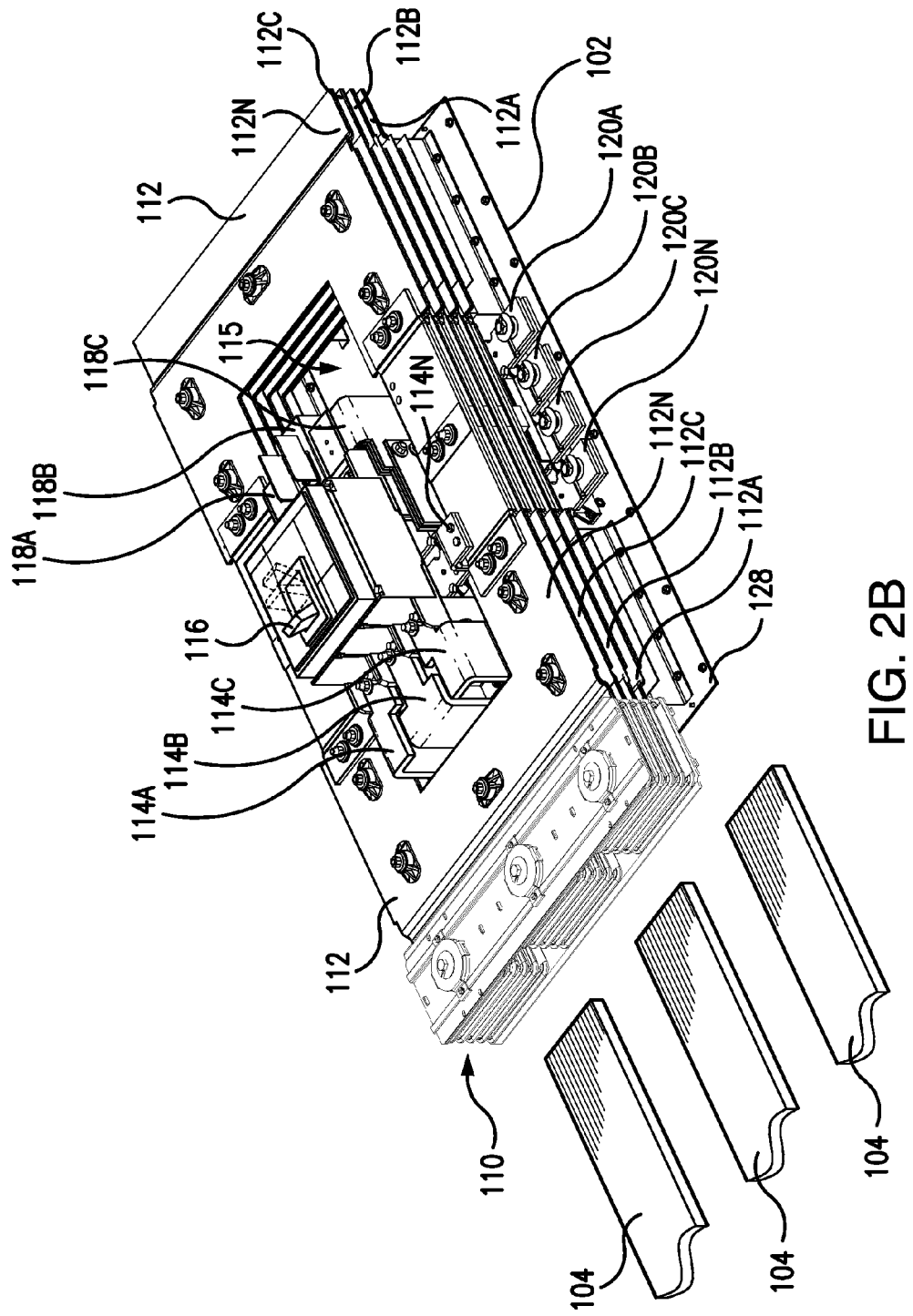
FIG. 2B is a front, right perspective view, as in FIG. 2A, showing three phased open-shaped bus bars and one neutral open-shaped bus bar, the open-shaped bus forming an opening through which a cross bus in back of the open-shaped bus, may be accessed from the front.

FIG. 2A is a front, right perspective view of the example busway center tap housing 101 in a tipped over horizontal position, lying on its back side with the front side 107 facing up. The figure shows a bottom portion of an open-shaped bus 112 (FIG. 2B) projecting from the bottom 123 of the central cabinet 109. The figure shows the left access port 113 on the left side 119 of the housing 101 for passage of the cross bus 120A-N (FIG. 2B).

FIG. 2B is a front, right perspective view, as in FIG. 2A, of the example open-shaped bus 112. In accordance with an example embodiment of the invention, the busway center tap 102 comprises the open-shaped bus 112 located in the housing 101. The open-shaped bus 112 forms an opening 115 through which the cross bus 120A-N may be accessed from the front side. The open-shaped bus 112 includes three phased open-shaped bus bars 112A, 112B, and 112C electrically connected to respective feeder bus bar phases. The open-shaped bus 112 includes one neutral open-shaped bus bar 112N. The three phased feeder bus bars and one neutral feeder bus bar of the feeder busway 104, may each be electrically connected by the joint pack 110 to a respective one of the three phased open-shaped bus bars 112A, 112B, and 112C and one neutral open-shaped bus bar 112N. The open-shaped bus 112 is located in the interior space of the housing 101 and along a front portion of the interior space. The cross bus 120 extends horizontally along the back portion of the interior space of the housing and may be accessed through the opening 115 in the open-shaped bus 112, from the front portion of the interior space.

The figure shows a circuit interrupter 116, which may be a master switch or a circuit breaker, mounted to the cross bus and the open-shaped bus and compactly positioned in the opening 115 formed by the open-shaped bus 112. The circuit interrupter 116 includes three phased line side bus connectors 114A, 114B, and 114C, each of the line side connectors being electrically connected to a respective open-shaped bus bar phase 112A, 112B, and 112C. The circuit interrupter 116 includes three phased load side bus connectors 118A, 118B, and 118C, each of the load side connectors being electrically coupled to a respective cross bus bar phase 120A, 120B, and 120C. A connector 114N is electrically connected to the neutral open-shaped bus bar 112N and directly connects to the neutral the cross bus 120N. Each of the cross bus bars 120A, 120B, 120C, and 120N is electrically coupled to provide power to the metering stacks 106 and 106' on both sides of the housing 101, in a center tap configuration.

In accordance with an example embodiment of the invention, the positioning of the circuit interrupter 116 in the opening 115 formed by the open-shaped bus 112, provides a compact, planar layout occupying minimal space with minimal complexity, enabling a reduction in overall size of the busway center tap 102. The width of the open-shaped bus 112 enables it to accept single, double, triple, or multiple runs of a feeder bus 104. Accordingly, the open-shaped bus 112 minimizes the space occupied by the meter center, while maximizing the input current-handling capacity of the unit. In an alternate embodiment, the open-shaped bus bars may be directly connected through the opening 115 formed by the open-shaped bus, to the cross bus bars.

Figure 3:
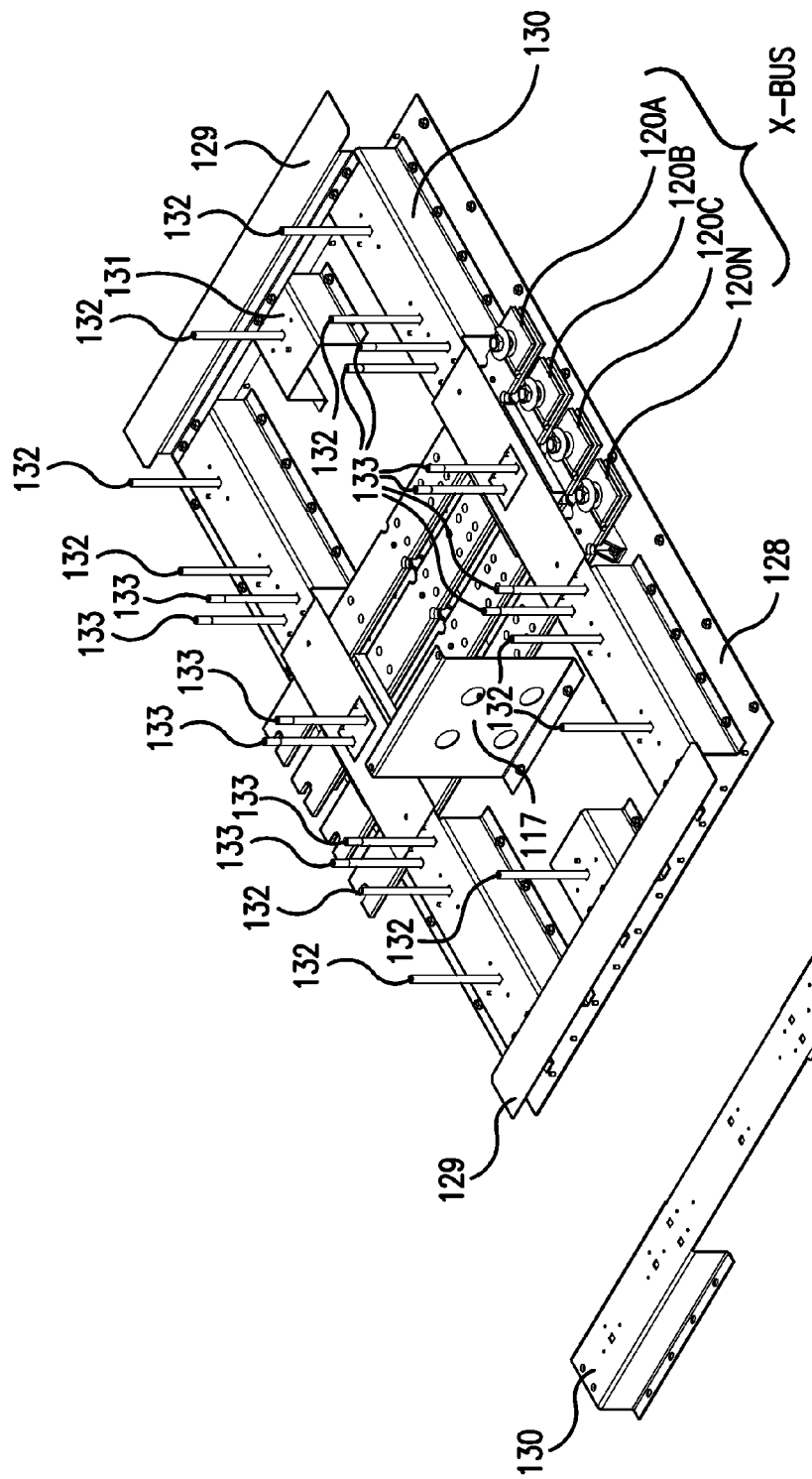
FIG. 3 is a front, right perspective view, as in FIG. 2A, showing the cross bus.

FIG. 3 is a front, right perspective view, as in FIG. 2A, showing the example cross bus bar phases 120A, 120B, and 120C, and neutral 120N, extending horizontally along the back wall 128 at the back side of the housing 101. The standoffs 130 and 131 are mounted on the back wall 128 of the housing, and support the open-shaped bus 112. The bolts 132 and insulated bolts 133 fasten the open-shaped bus 112 to the back wall 128. The housing 101 is grounded for safety, and ground plates 129 are shown, which will electrically and mechanically connect with grounded outer layers of the joint pack cover 111 and ground buses on the outside of the feeder busway 104, as shown in FIG. 6A. The support base 117 for the circuit interrupter 116, is shown mounted to the back wall 128 of the housing 101.

Figure 4:
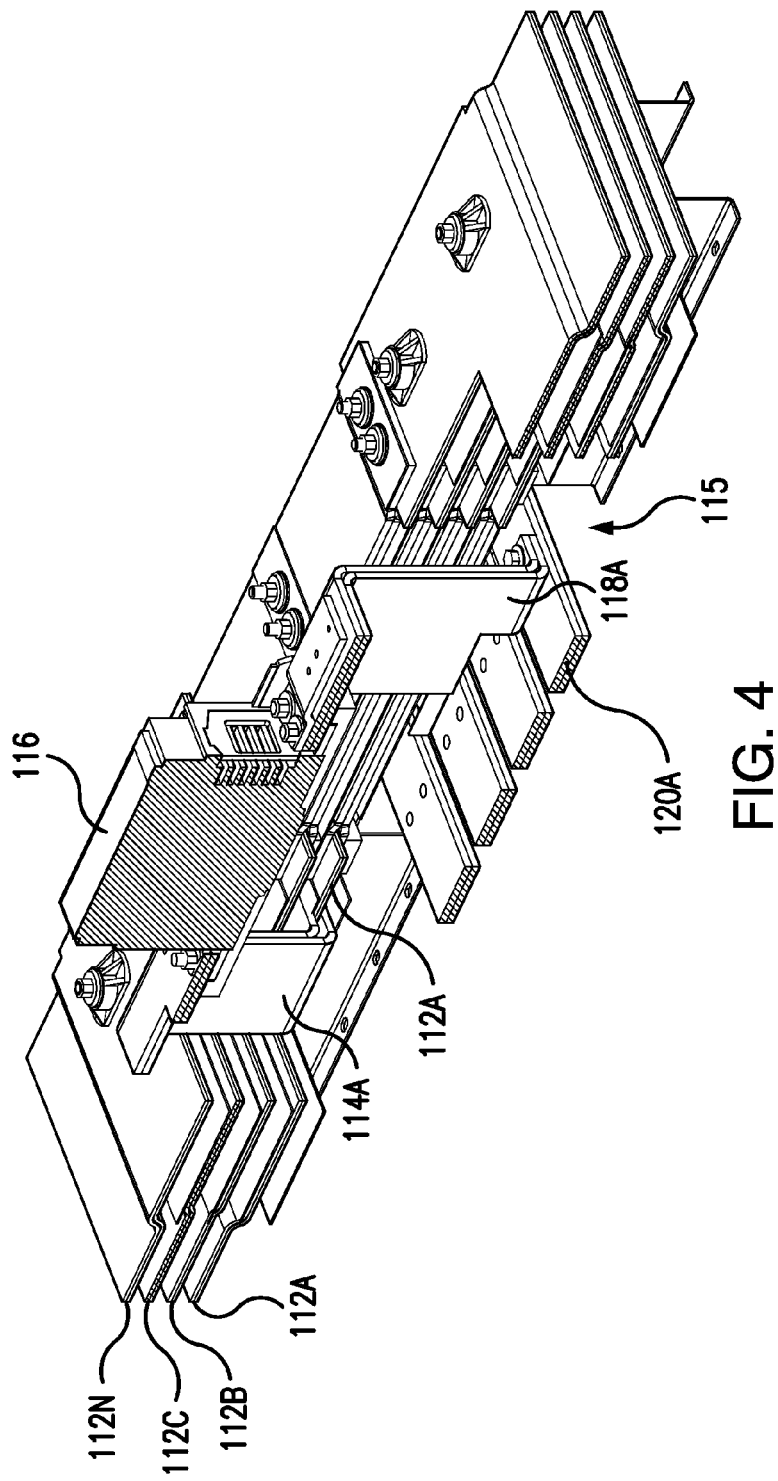
FIG. 4 is a front, right perspective view, in partial cross section, lying on its back side with the front side facing up, showing the a circuit interrupter compactly positioned in the opening formed by the open-shaped bus, the circuit interrupter including the A-phase line side connector electrically connected to the open-shaped bus bar A-phase, and the A-phase load side connector electrically connected to the cross bus bar A-phase.

FIG. 4 is a front, right perspective view, in partial cross section, of the example open-shaped bus 112 lying on its back side with the front side facing up, showing the circuit interrupter 116 compactly positioned in the opening 115 formed by the open-shaped bus 112. The circuit interrupter 116 is shown including the A-phase line side connector 114A electrically connected to the open-shaped bus bar A-phase 112A, and the A-phase load side connector 118A electrically connected to the cross bus bar A-phase 120A.

In one example embodiment of the invention, the circuit interrupter 116 may be a circuit breaker with the line side bus connector 114A electrically connected to the open-shaped bus bar 112A and the load side bus connector 118A electrically connected to the cross bus bar 120A.

In another example embodiment of the invention, the circuit interrupter 116 may be a master switch with the line side bus connector 114A electrically connected to the open-shaped bus bar 112A and the load side bus connector 118A either directly connected the cross bus bar 120A or connected through a fuse 134A (FIG. 8) to the cross bus bar 120A.

In still another example embodiment of the invention, the circuit interrupter 116 is omitted and the line side bus connector 114A is directly connected to (or integral with) the load side bus connector 118A, to directly electrically connect the open-shaped bus bar 112A to the cross bus bar 120A, through the opening 115 formed by the open-shaped bus 112.

Figure 5:
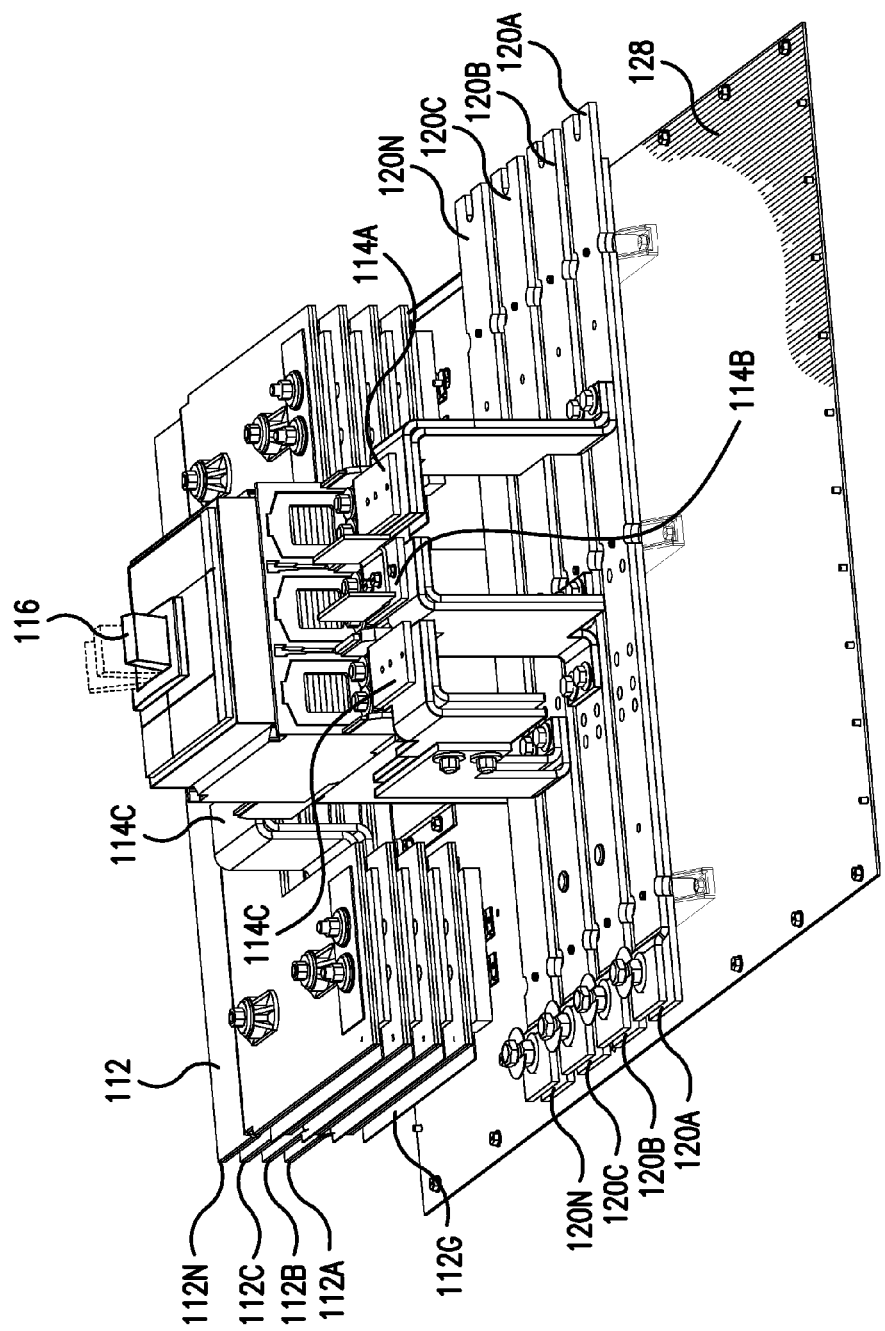
FIG. 5 is a front, top perspective view of the open-shaped bus, lying on its back side, showing the a circuit interrupter including the C-phase line side connector electrically connected to the open-shaped bus bar C-phase, and the C-phase load side connector electrically connected to the cross bus bar C-phase.

FIG. 5 is a front, top perspective view of the example open-shaped bus 112, lying on its back side, showing the circuit interrupter 116 including the C-phase line side connector 114C electrically connected to the open-shaped bus bar C-phase 112C, and the C-phase load side connector 114C electrically connected to the cross bus bar C-phase 120C.

Figure 6B:
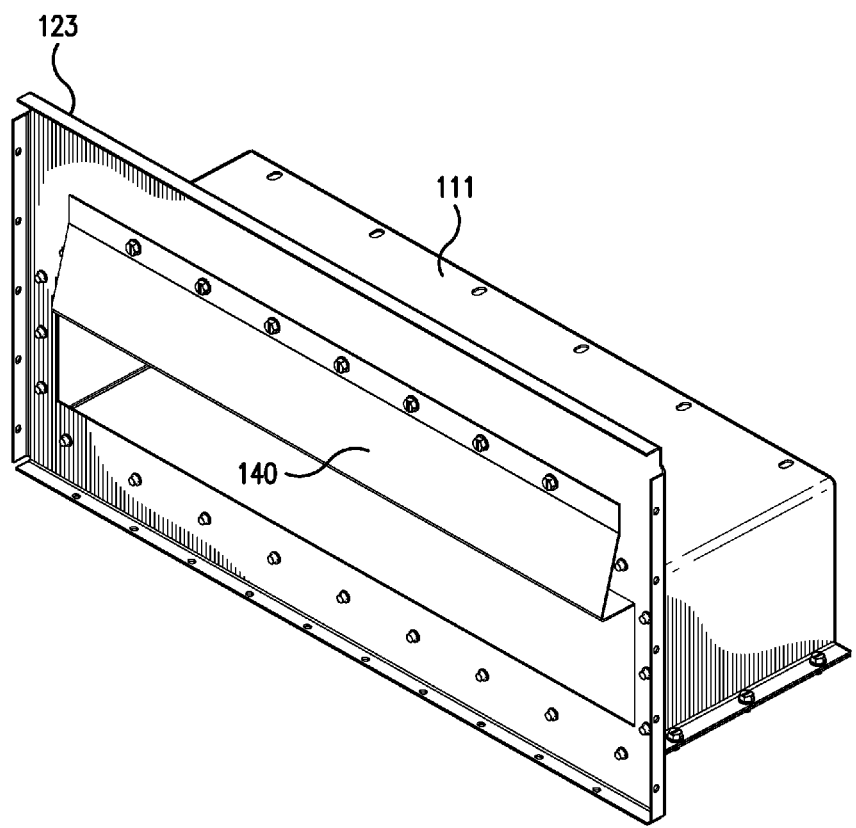
FIG. 6B is a front, right perspective view, as in FIG. 2A, showing the front ground plate mounted on the bottom side of the housing, and the bottom joint pack cover for covering the joint pack of FIG. 6A.

FIG. 6A is a side view, in partial cross section, of the example open-shaped bus 112, lying on its back side, showing the three phased feeder bus bars and one neutral feeder bus bar of the feeder busway 104, are each electrically connected by the joint pack 110 to a respective one of the three phased open-shaped bus bars 112A, 112B, and 112C and one neutral open-shaped bus bar 112N. The joint pack cover 111 provides a cover for the busway cover 105 of the feeder bus 104, the joint pack 110, and the central cabinet 109, at the bottom side 123 of the busway center tap 102. The back ground plate 129 and front ground plate 140 are clamped by the joint pack 110, to electrically connect with the ground buses on the outside of the feeder busway 104 to provide a secure and safe grounding for the housing 101. FIG. 6B is a front, right perspective view, as in FIG. 2A, showing the front ground plate 140 mounted on the bottom side 123 of the housing 101, and the bottom joint pack cover 111 for covering the joint pack 110 (FIG. 6A).

Figure 7A:
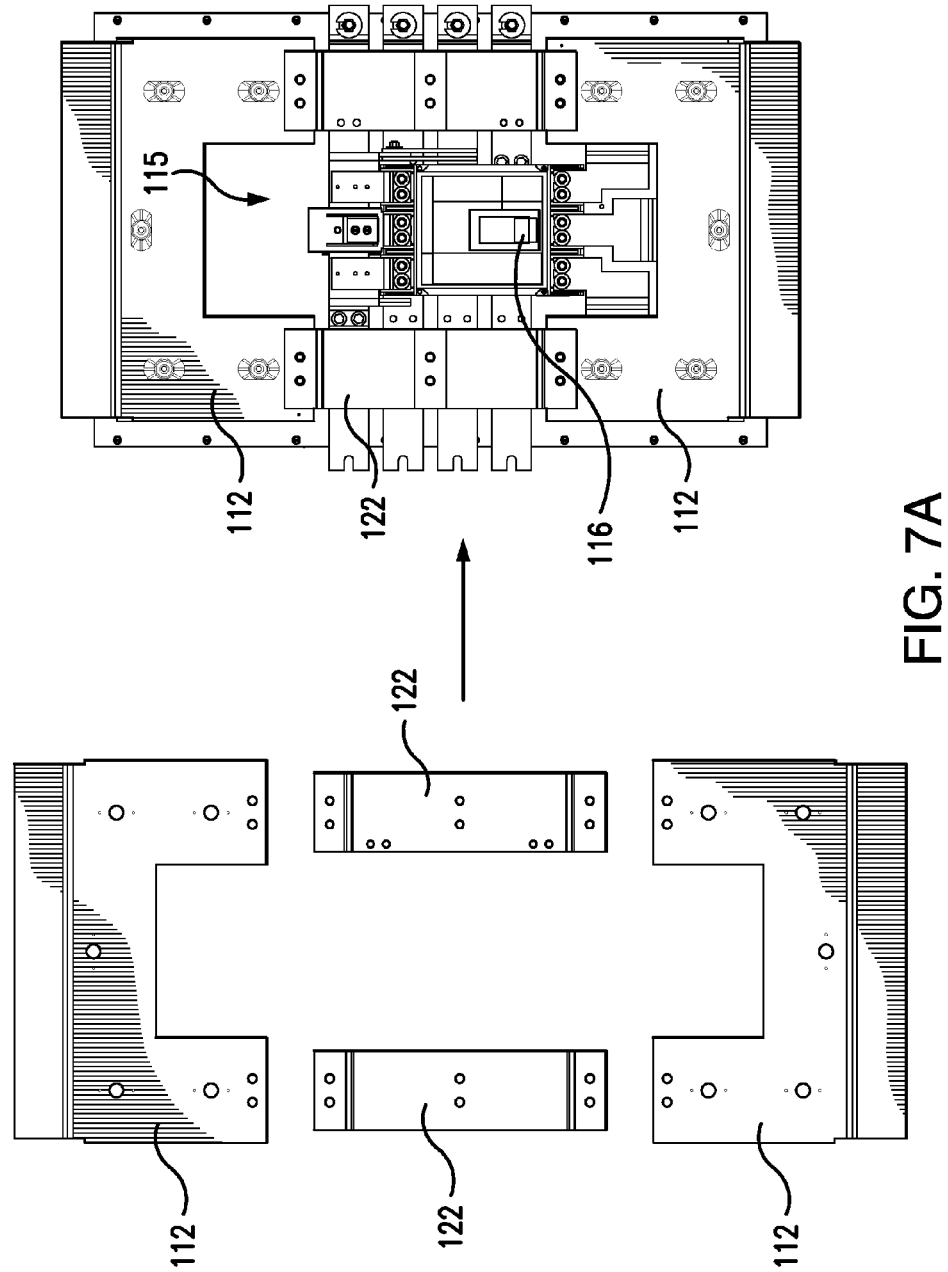
FIG. 7A is a front view of the open-shaped bus with an overall O-shape of a rectangular annulus surrounding the opening, the open-shaped bus including first and second U-shaped buses and first and second straight buses.

FIG. 7A is a front view of an example embodiment of the open-shaped bus 112 with an overall O-shape of a rectangular annulus surrounding the opening 115, the open-shaped bus including first and second U-shaped buses 112 and first and second straight buses 122. The first U-shaped bus is configured to electrically connect to the feeder bus 104, the first U-shaped bus having a left leg and a right leg pointing toward the top side of the housing. The second U-shaped bus is configured to electrically connect to the riser bus 104', the second U-shaped bus having a left leg and a right leg pointing toward the bottom side of the housing. The right leg of the first U-shaped bus is aligned with the right leg of the second U-shaped bus. The first straight bus electrically connects the right leg of the first U-shaped bus with the right leg of the second U-shaped bus. The left leg of the first U-shaped bus is aligned with the left leg of the second U-shaped bus. The second straight bus electrically connects the left leg of the first U-shaped bus with the left leg of the second U-shaped bus.

Figure 7B:
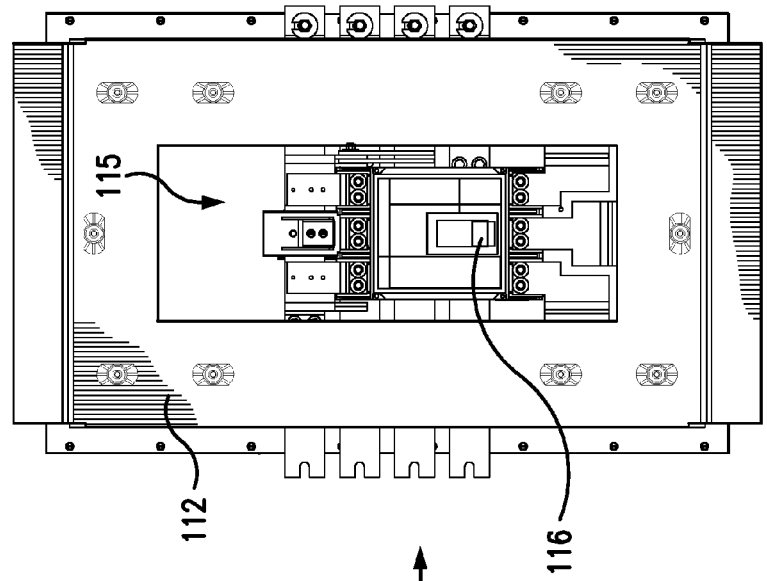
FIG. 7B is a front view of the open-shaped bus with an O-shaped rectangular annulus surrounding the opening.
Figure 7B:
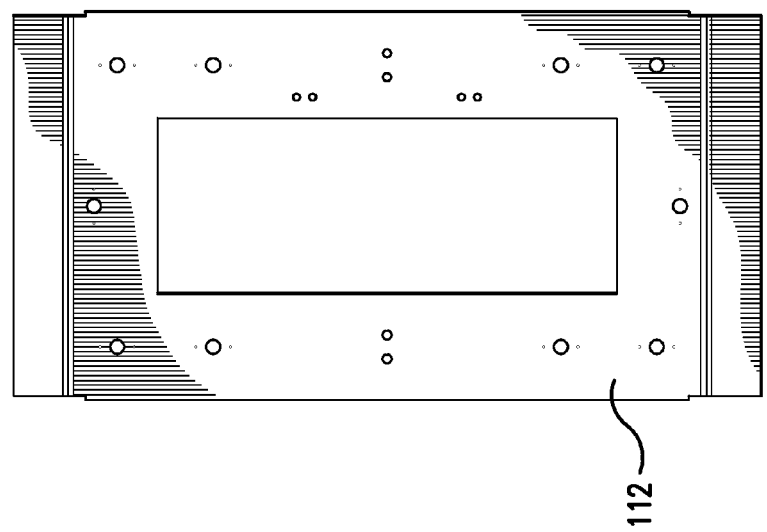

FIG. 7B is a front view of an example embodiment of the open-shaped bus 112 with an O-shaped rectangular annulus surrounding the opening 115. Each of the open-shaped bus bars has a planar shape contained between two concentric axis-parallel rectangles having a common center and parallel sides, an upper side of the bus being configured to electrically connect to the riser bus 104' and a lower side of the bus being configured to electrically connect to the feeder bus 104.

Figure 7C:
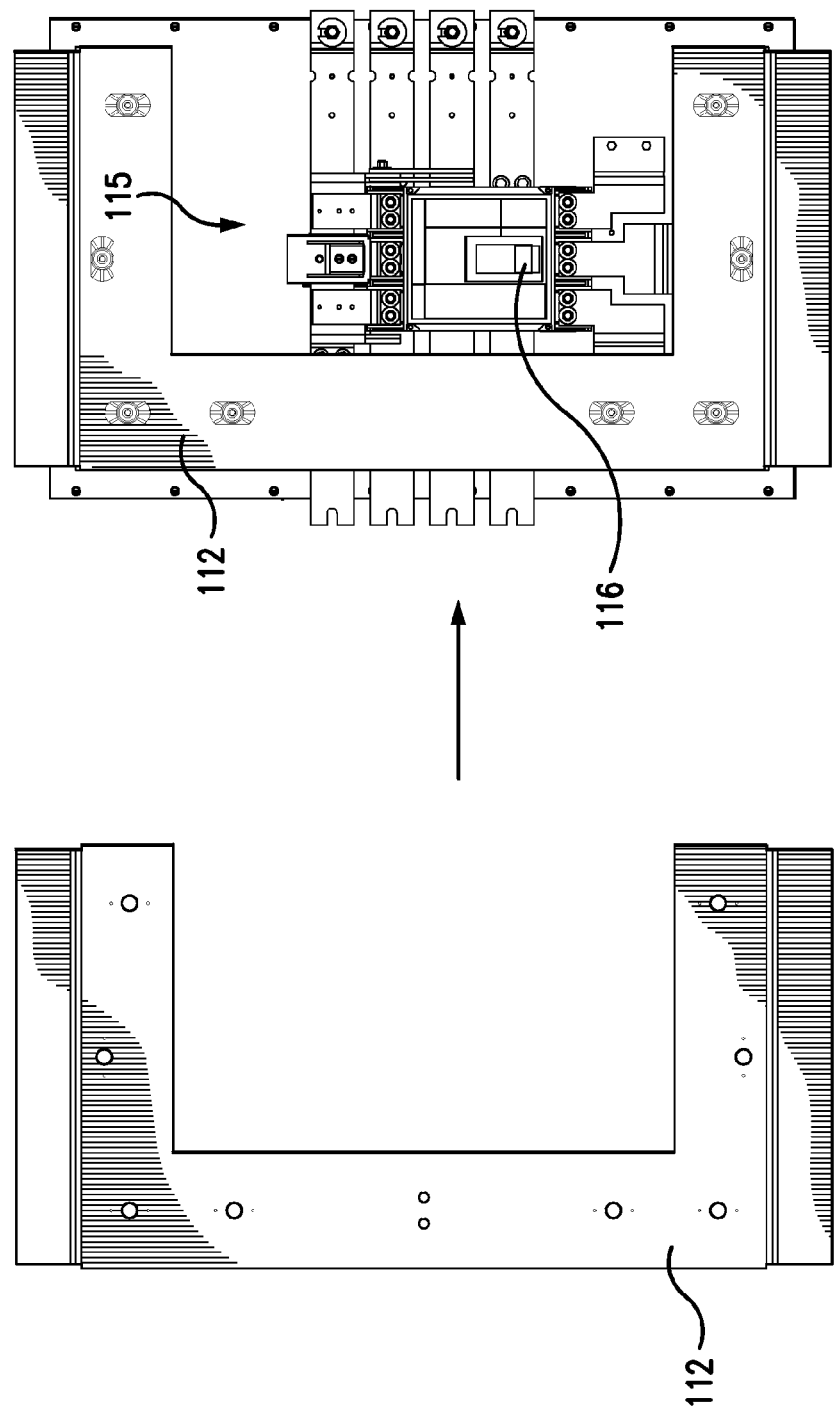
FIG. 7C is a front view of the open-shaped bus with a C-shape surrounding a portion of the opening.

FIG. 7C is a front view of an example embodiment of the open-shaped bus 112 with a C-shape surrounding a portion of the opening 115. The C-shape has an upper arm near the top side of the housing and is configured to electrically connect to the riser bus 104'. The C-shape has a lower arm near the bottom side of the housing and configured to electrically connect to the feeder bus 104.

Figure 7D:
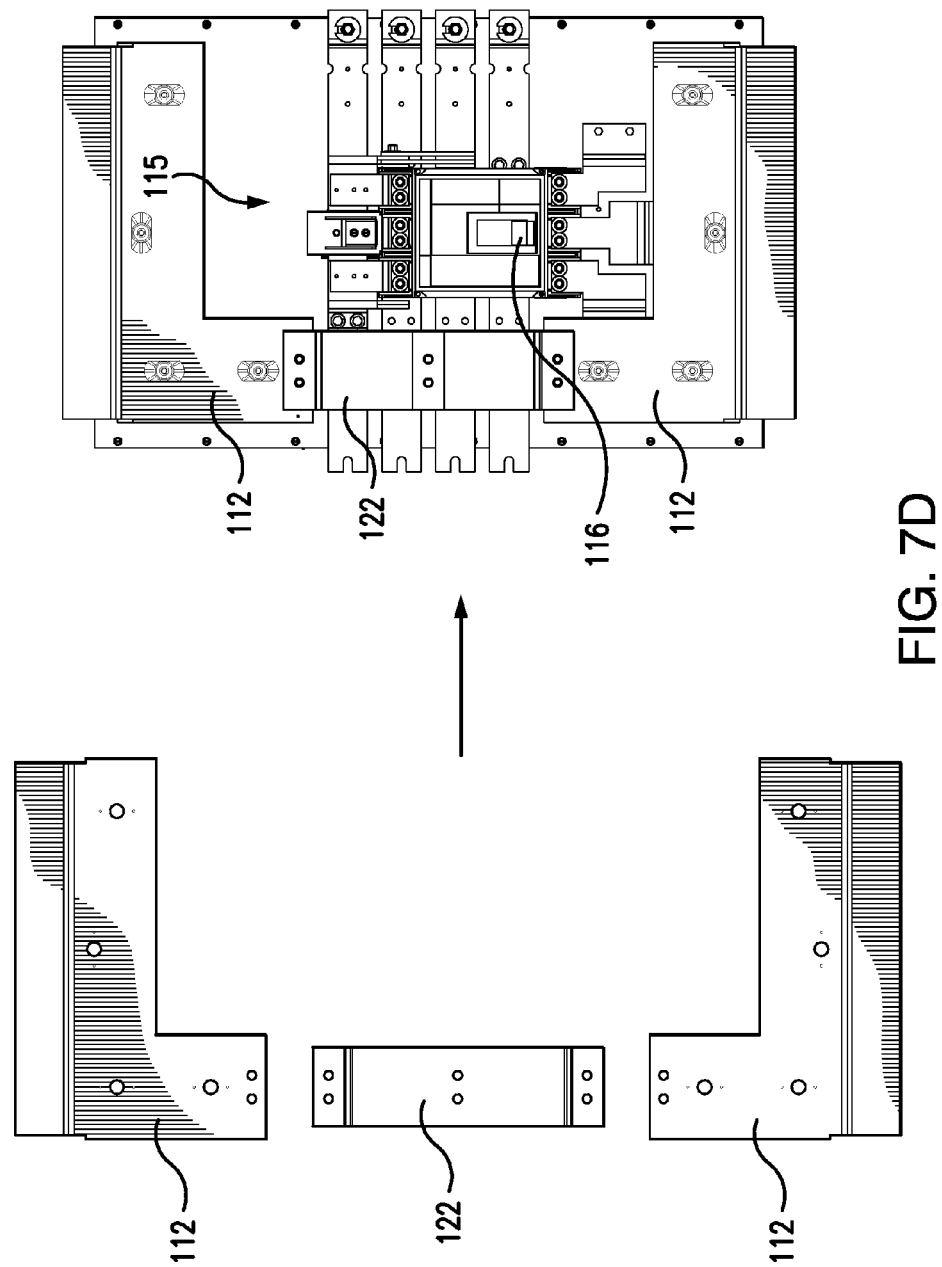
FIG. 7D is a front view of the open-shaped bus with first and second L-shaped buses and a straight bus.

FIG. 7D is a front view of an example embodiment of the open-shaped bus 112 with first and second L-shaped buses 112 and a straight bus 122. The open-shaped bus 112 generally has a C-shape surrounding a portion of the opening 115. The first L-shaped bus is configured to electrically connect to the riser bus 104', the first L-shaped bus having a leg pointing toward the bottom side of the housing 101 and an arm pointing to a side of the housing. The second L-shaped bus is configured to electrically connect to the feeder bus 104, the second L-shaped bus having a leg pointing toward the top side of the housing 101 and an arm pointing to the same side as does the arm of the first L-shaped bus. The leg of the first L-shaped bus is aligned with the leg of the second L-shaped bus. The straight bus electrically connects the leg of the first L-shaped bus with the leg of the second L-shaped bus.

Figure 8:
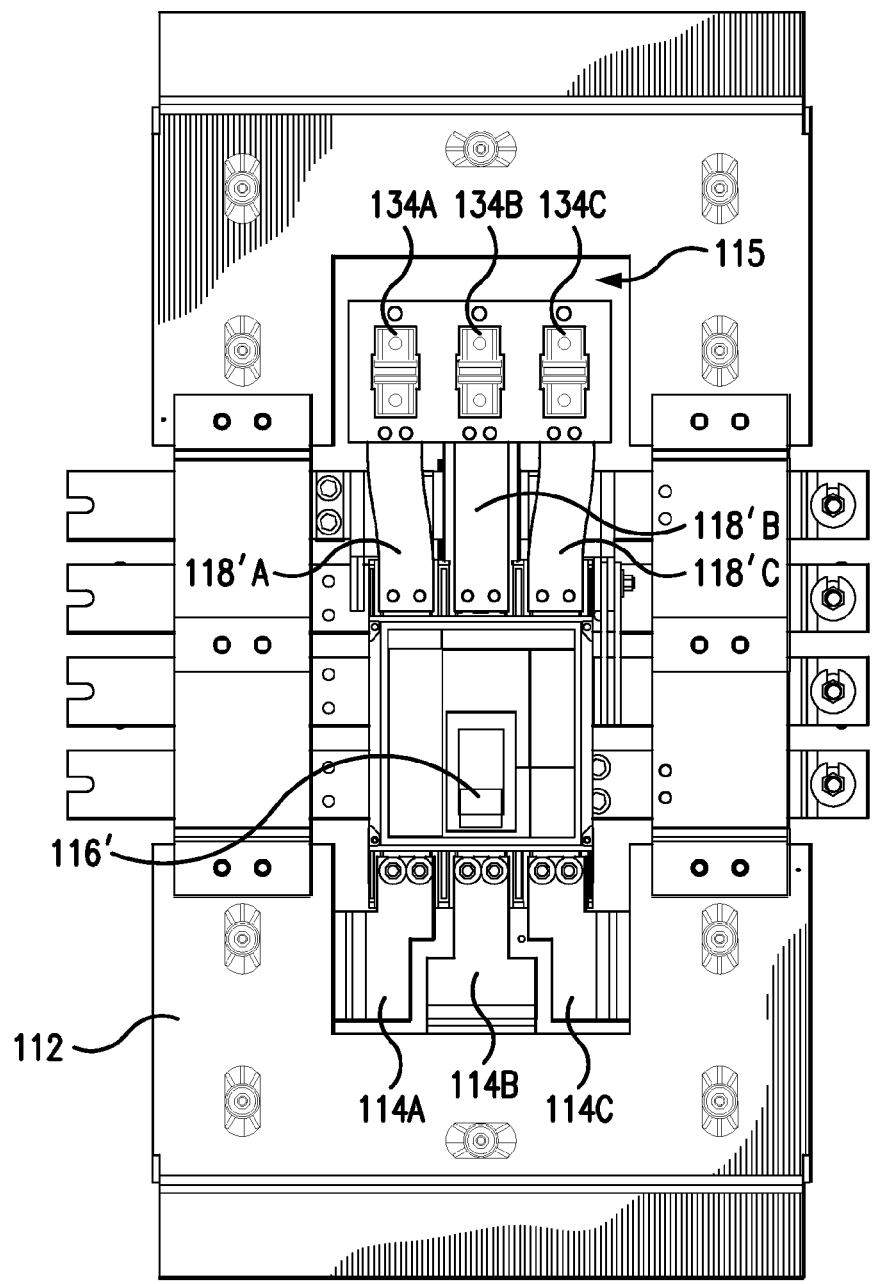
FIG. 8 is a front view of the open-shaped bus, wherein the circuit interrupter is a switch located in the opening formed by the open-shaped bus.

FIG. 8 is a front view of the example open-shaped bus 112, wherein the circuit interrupter 116 is a master switch 116' located in the opening 115 formed by the open-shaped bus 112. The figure shows the master switch 116', compactly positioned in the opening 115 formed by the open-shaped bus 112. The master switch 116' includes three phased line side connectors 114A, 114B, and 114C, each of the line side connectors being electrically connected to a respective open-shaped bus bar phase 112A, 112B, and 112C. The master switch 116' includes three phased load side connectors 118'A, 118'B, and 118'C, each of the load side connectors being electrically connected through a respective fuse 134A, 134B, and 134C, to the respective cross bus bar phase 120A, 120B, and 120C. Each of the cross bus bars 120A, 120B, and 120C is electrically coupled to provide power to the metering stacks 106 and 106' on both sides of the housing 101, in a center tap configuration.

The resulting meter center has a simplified structure, occupies minimal space, and can accept more than one feeder bus.

Although specific example embodiments of the invention have been disclosed, persons of skill in the art will appreciate that changes may be made to the details described for the specific example embodiments, without departing from the spirit and the scope of the invention.

The invention claimed is:

1. A busway center tap for a meter center, comprising:
a housing for a busway center tap for a meter center, configured to mechanically connect to a feeder busway at a bottom side of the housing, the feeder busway including feeder bus bars that are electrically coupled to a utility power source;
a cross bus passing through access ports on left and right sides of the housing and through an interior space of the housing, the cross bus including cross bus bars extending horizontally along a back portion of the interior space of the housing, wherein the cross bus bars are electrically coupled to provide power to one or more branch power meters located outside of the housing; and
an open-shaped bus located in the interior space of the housing and along a front portion of the interior space, in front of the back portion, the open-shaped bus including open-shaped bus bars that are electrically connected to the feeder bus bars, the open-shaped bus forming an opening through which the cross bus may be accessed from the front portion of the interior space.

2. The busway center tap for a meter center of claim 1, wherein the open-shaped bus is an O-shaped rectangular annulus surrounding the opening, and the open-shaped bus bars have a planar shape contained between two concentric axis-parallel rectangles having a common center and parallel sides, a lower side of the open-shaped bus being configured to electrically connect to the feeder bus.

3. The busway center tap for a meter center of claim 1, wherein the open-shaped bus has an overall O-shape of a rectangular annulus surrounding the opening, the open-shaped bus including first and second U-shaped buses and first and second straight buses, the first U-shaped bus being configured to electrically connect to the feeder bus, the first U-shaped bus having a left leg and a right leg pointing toward the top side of the housing, the second U-shaped bus having a left leg and a right leg pointing toward the bottom side of the housing, the right leg of the first U-shaped bus being aligned with the right leg of the second U-shaped bus, the first straight bus electrically connecting right leg of the first U-shaped bus with the right leg of the second U-shaped bus, the left leg of the first U-shaped bus being aligned with the left leg of the second U-shaped bus, the second straight bus electrically connecting left leg of the first U-shaped bus with the left leg of the second U-shaped bus.

4. The busway center tap for a meter center of claim 1, wherein the open-shaped bus generally has a C-shape surrounding a portion of the opening, the C-shape having an upper arm near the top side of the housing, the C-shape having a lower arm near the bottom side of the housing and configured to electrically connect to the feeder bus.

5. The busway center tap for a meter center of claim 1, wherein the open-shaped bus generally has a C-shape surrounding a portion of the opening, the open-shaped bus including first and second L-shaped buses and a straight bus, the first L-shaped bus having a leg pointing toward the bottom side of the housing and an arm pointing to a side of the housing, the second L-shaped bus being configured to electrically connect to the feeder bus, the second L-shaped bus having a leg pointing toward the top side of the housing and an arm pointing to the same side as does the arm of the first L-shaped bus, the leg of the first L-shaped bus being aligned with the leg of the second L-shaped bus, the straight bus electrically connecting the leg of the first L-shaped bus with the leg of the second L-shaped bus.

6. The busway center tap for a meter center of claim 1, further comprising:
a circuit interrupter mounted to the cross bus and the open-shaped bus and positioned in the opening formed by the open-shaped bus, the circuit interrupter including line side connectors that are electrically connected to the open-shaped bus bars, the circuit interrupter including load side connectors that are electrically coupled to the cross bus bars.

7. The busway center tap for a meter center of claim 6, wherein the circuit interrupter is a switch located in the opening formed by the open-shaped bus, and fuses are located in the opening, the fuses being connected to the switch.

8. The busway center tap for a meter center of claim 1, wherein the feeder bus bars are electrically connected by a joint pack to the open-shaped bus bars.

9. The busway center tap for a meter center of claim 1, wherein the housing comprises a central cabinet including the access ports on the left and right sides of the housing, configured to pass the cross bus through access ports, a lower joint pack cover at the bottom of the central cabinet, configured to cover a joint pack and the feeder busway at the bottom side of the housing, and a upper joint pack cover at the top of the central cabinet, configured to cover a joint pack and a riser busway at the top side of the housing.

10. The busway center tap for a meter center of claim 1, wherein the cross bus is electrically coupled to a first meter stack of branch power meters located on the left side of the housing and is electrically coupled to a second meter stack of branch power meters located on the right side of the housing.

11. The busway center tap for a meter center of claim 1, wherein the feeder busway is comprised of a single component bus or plural component buses in a double, triple, or multiple run, each component bus being electrically connected by a common joint pack to the open-shaped bus bars, to balance current carried in the component buses.

12. The busway center tap for a meter center of claim 1, wherein the busway center tap is configured to connect to a riser busway at a top side of the busway center tap, the riser busway including riser bus bars, and the open-shaped bus bars being electrically connected between the feeder bus bars and the riser bus bars.

13. The busway center tap for a meter center of claim 1, wherein the open-shaped bus includes three phased open-shaped bus bars and one neutral open-shaped bus bar, each of the open-shaped bus bar phases being electrically connected between a respective feeder bus bar phase and a respective riser bus bar phase.

14. The busway center tap for a meter center of claim 1, wherein the open-shaped bus bars are directly connected through the opening formed by the open-shaped bus, to the cross bus bars.

15. The busway center tap for a meter center of claim 1, wherein a back ground plate of the housing and front plate of the housing are clamped by a joint pack to ground buses on the feeder busway, to provide grounding for the housing.

\* \* \* \* \*